(12) United States Patent
Mosko

(10) Patent No.: US 10,075,521 B2
(45) Date of Patent: Sep. 11, 2018

(54) COLLECTION SYNCHRONIZATION USING EQUALITY MATCHED NETWORK NAMES

(71) Applicant: CISCO TECHNOLOGY, INC., San Jose, CA (US)

(72) Inventor: Marc E. Mosko, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 614 days.

(21) Appl. No.: 14/247,169

(22) Filed: Apr. 7, 2014

(65) Prior Publication Data
US 2015/0288755 A1  Oct. 8, 2015

(51) Int. Cl.
*H04L 29/08* (2006.01)
*H04L 29/06* (2006.01)
*G06F 17/30* (2006.01)

(52) U.S. Cl.
CPC .... *H04L 67/1095* (2013.01); *G06F 17/30174* (2013.01); *H04L 65/1069* (2013.01); *H04L 65/4084* (2013.01); *H04L 67/327* (2013.01)

(58) Field of Classification Search
None
See application file for complete search history.

(56) References Cited

U.S. PATENT DOCUMENTS

| | | | |
|---|---|---|---|
| 817,441 | A | 4/1906 | Niesz |
| 4,309,569 | A | 1/1982 | Merkle |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Wetherall, David, "Active Network vision and reality: Lessons form a capsule-based system", ACM Symposium on Operating Systems Principles, Dec. 1, 1999. pp. 64-79.

(Continued)

*Primary Examiner* — Vivek Srivastava
*Assistant Examiner* — Hien Doan

(57) ABSTRACT

One embodiment provides a system that facilitates synchronization collections of data between a local and a remote node by using exact match names. During operation, a local node receives an advertisement corresponding to a remote manifest at a remote node. A manifest represents a collection of content objects at a node. In some embodiments, a manifest corresponds to a root hash value that identifies the content objects of the collection. The local node determines that the local manifest and the remote manifest both indicate the same collection of content objects. The local node then determines if the content of the collections are different by comparing the root hash value of the local manifest with the root hash value of the remote manifest. Responsive to determining that the root hash values of the manifests are different, the local node retrieves the remote manifest by sending a request for the remote manifest. The local node determines which content objects identified in the remote manifest are different from the content objects identified in the local manifest. The local node transmits a set of interests for the content objects that are different and receives the requested set of content objects, thereby facilitating synchronization of content objects associated with the manifests at both the local and remote node.

25 Claims, 11 Drawing Sheets

(56) References Cited

U.S. PATENT DOCUMENTS

| | | | |
|---|---|---|---|
| 4,921,898 | A | 5/1990 | Lenney |
| 5,070,134 | A | 12/1991 | Oyamada |
| 5,110,856 | A | 5/1992 | Oyamada |
| 5,506,844 | A | 4/1996 | Rao |
| 5,629,370 | A | 5/1997 | Freidzon |
| 5,870,605 | A | 2/1999 | Bracho |
| 6,052,683 | A | 4/2000 | Irwin |
| 6,091,724 | A | 7/2000 | Chandra |
| 6,173,364 | B1 | 1/2001 | Zenchelsky |
| 6,226,618 | B1 | 5/2001 | Downs |
| 6,233,646 | B1 | 5/2001 | Hahm |
| 6,332,158 | B1 | 12/2001 | Risley |
| 6,366,988 | B1 | 4/2002 | Skiba |
| 6,574,377 | B1 | 6/2003 | Cahill |
| 6,654,792 | B1 | 11/2003 | Verma |
| 6,667,957 | B1 | 12/2003 | Corson |
| 6,681,220 | B1 | 1/2004 | Kaplan |
| 6,681,326 | B2 | 1/2004 | Son |
| 6,769,066 | B1 | 7/2004 | Botros |
| 6,772,333 | B1 | 8/2004 | Brendel |
| 6,862,280 | B1 | 3/2005 | Bertagna |
| 6,901,452 | B1 | 5/2005 | Bertagna |
| 6,917,985 | B2 | 7/2005 | Madruga |
| 6,968,393 | B1 | 11/2005 | Chen |
| 6,981,029 | B1 | 12/2005 | Menditto |
| 7,013,389 | B1 | 3/2006 | Srivastava |
| 7,031,308 | B2 | 4/2006 | Garcia-Luna-Aceves |
| 7,061,877 | B1 | 6/2006 | Gummalla |
| 7,206,860 | B2 | 4/2007 | Murakami |
| 7,257,837 | B2 | 8/2007 | Xu |
| 7,287,275 | B2 | 10/2007 | Moskowitz |
| 7,315,541 | B1 | 1/2008 | Housel |
| 7,339,929 | B2 | 3/2008 | Zelig |
| 7,350,229 | B1 | 3/2008 | Lander |
| 7,382,787 | B1 | 6/2008 | Barnes |
| 7,444,251 | B2 | 10/2008 | Nikovski |
| 7,466,703 | B1 | 12/2008 | Arunachalam |
| 7,472,422 | B1 | 12/2008 | Agbabian |
| 7,496,668 | B2 | 2/2009 | Hawkinson |
| 7,509,425 | B1 | 3/2009 | Rosenberg |
| 7,523,016 | B1 | 4/2009 | Surdulescu |
| 7,543,064 | B2 | 6/2009 | Juncker |
| 7,552,233 | B2 | 6/2009 | Raju |
| 7,555,482 | B2 | 6/2009 | Korkus |
| 7,555,563 | B2 | 6/2009 | Ott |
| 7,567,547 | B2 | 7/2009 | Mosko |
| 7,567,946 | B2 | 7/2009 | Andreoli |
| 7,580,971 | B1 | 8/2009 | Gollapudi |
| 7,623,535 | B2 | 11/2009 | Guichard |
| 7,647,507 | B1 | 1/2010 | Feng |
| 7,660,324 | B2 | 2/2010 | Oguchi |
| 7,672,235 | B1 * | 3/2010 | Lian ............ H04L 12/66 370/230 |
| 7,685,290 | B2 | 3/2010 | Satapati |
| 7,698,463 | B2 | 4/2010 | Ogier |
| 7,769,887 | B1 | 8/2010 | Bhattacharyya |
| 7,779,467 | B2 | 8/2010 | Choi |
| 7,801,177 | B2 | 9/2010 | Luss |
| 7,816,441 | B2 | 10/2010 | Elizalde |
| 7,831,733 | B2 | 11/2010 | Sultan |
| 7,908,337 | B2 | 3/2011 | Garcia-Luna-Aceves |
| 7,924,837 | B1 | 4/2011 | Shabtay |
| 7,953,885 | B1 | 5/2011 | Devireddy |
| 8,000,267 | B2 | 8/2011 | Solis |
| 8,010,691 | B2 | 8/2011 | Kollmansberger |
| 8,074,289 | B1 | 12/2011 | Carpentier |
| 8,117,441 | B2 | 2/2012 | Kurien |
| 8,160,069 | B2 | 4/2012 | Jacobson |
| 8,204,060 | B2 | 6/2012 | Jacobson |
| 8,214,364 | B2 | 7/2012 | Bigus |
| 8,224,985 | B2 | 7/2012 | Takeda |
| 8,225,057 | B1 | 7/2012 | Zheng |
| 8,271,578 | B2 | 9/2012 | Sheffi |
| 8,312,064 | B1 | 11/2012 | Gauvin |
| 8,386,622 | B2 | 2/2013 | Jacobson |
| 8,467,297 | B2 | 6/2013 | Liu |
| 8,553,562 | B2 | 10/2013 | Allan |
| 8,572,214 | B2 | 10/2013 | Garcia-Luna-Aceves |
| 8,654,649 | B2 | 2/2014 | Vasseur |
| 8,665,757 | B2 | 3/2014 | Kling |
| 8,667,172 | B2 | 3/2014 | Ravindran |
| 8,688,619 | B1 | 4/2014 | Ezick |
| 8,699,350 | B1 | 4/2014 | Kumar |
| 8,750,820 | B2 | 6/2014 | Allan |
| 8,761,022 | B2 | 6/2014 | Chiabaut |
| 8,762,477 | B2 | 6/2014 | Xie |
| 8,762,570 | B2 | 6/2014 | Qian |
| 8,762,707 | B2 | 6/2014 | Killian |
| 8,767,627 | B2 | 7/2014 | Ezure |
| 8,817,594 | B2 | 8/2014 | Gero |
| 8,826,381 | B2 | 9/2014 | Kim |
| 8,832,302 | B1 | 9/2014 | Bradford |
| 8,836,536 | B2 | 9/2014 | Marwah |
| 8,862,774 | B2 | 10/2014 | Vasseur |
| 8,898,112 | B1 * | 11/2014 | Natanzon ............ G06F 11/2074 707/634 |
| 8,903,756 | B2 | 12/2014 | Zhao |
| 8,937,865 | B1 | 1/2015 | Kumar |
| 9,071,498 | B2 | 6/2015 | Beser |
| 9,112,895 | B1 | 8/2015 | Lin |
| 2002/0010795 | A1 | 1/2002 | Brown |
| 2002/0048269 | A1 | 4/2002 | Hong |
| 2002/0054593 | A1 | 5/2002 | Morohashi |
| 2002/0077988 | A1 | 6/2002 | Sasaki |
| 2002/0078066 | A1 | 6/2002 | Robinson |
| 2002/0138551 | A1 | 9/2002 | Erickson |
| 2002/0176404 | A1 | 11/2002 | Girard |
| 2002/0188605 | A1 | 12/2002 | Adya |
| 2002/0199014 | A1 | 12/2002 | Yang |
| 2003/0046437 | A1 | 3/2003 | Eytchison |
| 2003/0048793 | A1 | 3/2003 | Pochon |
| 2003/0051100 | A1 | 3/2003 | Patel |
| 2003/0074472 | A1 | 4/2003 | Lucco |
| 2003/0097447 | A1 | 5/2003 | Johnston |
| 2003/0140257 | A1 | 7/2003 | Paterka |
| 2004/0024879 | A1 | 2/2004 | Dingman |
| 2004/0030602 | A1 | 2/2004 | Rosenquist |
| 2004/0073715 | A1 | 4/2004 | Folkes |
| 2004/0139230 | A1 | 7/2004 | Kim |
| 2004/0221047 | A1 | 11/2004 | Grover |
| 2004/0225627 | A1 | 11/2004 | Botros |
| 2004/0252683 | A1 | 12/2004 | Kennedy |
| 2005/0003832 | A1 | 1/2005 | Osafune |
| 2005/0028156 | A1 | 2/2005 | Hammond |
| 2005/0043060 | A1 | 2/2005 | Brandenberg |
| 2005/0050211 | A1 | 3/2005 | Kaul |
| 2005/0074001 | A1 | 4/2005 | Mattes |
| 2005/0149508 | A1 | 7/2005 | Deshpande |
| 2005/0159823 | A1 | 7/2005 | Hayes |
| 2005/0198351 | A1 | 9/2005 | Nog |
| 2005/0249196 | A1 | 11/2005 | Ansari |
| 2005/0259637 | A1 | 11/2005 | Chu |
| 2005/0262217 | A1 | 11/2005 | Nonaka |
| 2005/0289222 | A1 | 12/2005 | Sahim |
| 2006/0010249 | A1 | 1/2006 | Sabesan |
| 2006/0029102 | A1 | 2/2006 | Abe |
| 2006/0039379 | A1 | 2/2006 | Abe |
| 2006/0051055 | A1 | 3/2006 | Ohkawa |
| 2006/0072523 | A1 | 4/2006 | Richardson |
| 2006/0099973 | A1 | 5/2006 | Nair |
| 2006/0129514 | A1 | 6/2006 | Watanabe |
| 2006/0133343 | A1 | 6/2006 | Huang |
| 2006/0173831 | A1 | 8/2006 | Basso |
| 2006/0193295 | A1 | 8/2006 | White |
| 2006/0206445 | A1 | 9/2006 | Andreoli |
| 2006/0215684 | A1 | 9/2006 | Capone |
| 2006/0223504 | A1 | 10/2006 | Ishak |
| 2006/0256767 | A1 | 11/2006 | Suzuki |
| 2006/0268792 | A1 | 11/2006 | Belcea |
| 2007/0019619 | A1 | 1/2007 | Foster |
| 2007/0073888 | A1 | 3/2007 | Madhok |
| 2007/0094265 | A1 | 4/2007 | Korkus |
| 2007/0112880 | A1 | 5/2007 | Yang |
| 2007/0124412 | A1 | 5/2007 | Narayanaswami |

(56) References Cited

U.S. PATENT DOCUMENTS

| | | |
|---|---|---|
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1* | 8/2007 | Shaver ............... H04N 21/6543 709/219 |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006489 A1 | 1/2009 | Ramasubramanian et al. |
| 2009/0006640 A1* | 1/2009 | Brouwer ................. G06F 11/10 709/231 |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |

(56) References Cited

U.S. PATENT DOCUMENTS

| | | |
|---|---|---|
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1* | 2/2014 | Barton .............. H04L 67/1095 709/248 |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192780 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |
| 2015/0207864 A1* | 7/2015 | Wilson .............. G06F 21/121 709/203 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120419 A2 | 11/2009 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2014/036605 A1 | 3/2014 |

OTHER PUBLICATIONS

Kulkarni A.B. et al., "Implementation of a prototype active network", IEEE, Open Architectures and Network Programming, Apr. 3, 1998, pp. 130-142.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

Detti et al., "Supporting the Web with an information centric network that routes by name", Aug. 2012, Computer Networks 56, pp. 3705-3702.

Garcia-Luna-Aceves et al., "Automatic Routing Using Multiple Prefix Labels", 2012, IEEE, Ad Hoc and Sensor Networking Symposium.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

L. Wang et al., 'OSPFN: An OSPF Based Routing Protocol for Named Data Networking,' Technical Report NDN-0003, 2012.

Merindol et al., "An efficient algorithm to enable path diversity in link state routing networks", Jan. 10, Computer Networks 55 (2011), pp. 1132-1140.

Soh et al., "Efficient Prefix Updates for IP Router Using Lexicographic Ordering and Updateable Address Set", Jan. 2008, IEEE Transactions on Computers, vol. 57, No. 1.

V. Jacobson et al., 'Networking Named Content,' Proc. IEEE CoNEXT '09, Dec. 2009.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Lynn$2E.

C. Gentry and A. Silverberg. Hierarchical ID-Based Cryptography. Advances in Cryptology—ASIACRYPT 2002. Springer Berlin Heidelberg (2002).

(56) References Cited

OTHER PUBLICATIONS

D. Boner, C. Gentry, and B. Waters, 'Collusi.
Hogue et al., "NLSR: Named-data Link State Routing Protocol", Aug. 12, 2013, ICN'13.
D. Boneh and M. Franklin. Identity-Based Encryption from the Weil Pairing. Advances in Cryptology—CRYPTO 2001, vol. 2139, Springer Berlin Heidelberg (2001).
G. Ateniese, K. Fu, M. Green, and S. Hohenberger. Improved Proxy Reencryption Schemes with Applications to Secure Distributed Storage. In the 12th Annual Network and Distributed System Security Sympo.
H. Xiong, X. Zhang, W. Zhu, and D. Yao. CloudSeal: End-to$2.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digital Rights Management using Broadcast Encryption. Proceedings of the IEEE 92.6 (2004).
J. Shao and Z. Cao. CCA-Secure Proxy Re-Encryption without Pairings. Public Key Cryptography. Springer Lecture Notes in Computer ScienceVolume 5443 (2009).
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: An architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd USENIX Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/.downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and counter-measures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the

(56) References Cited

OTHER PUBLICATIONS gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. H Balakrishnan, and S. Shenker, "Untangling the web from DNS," in Proc. USENIX NSDI 2004, Oct. 2010, pp. 735-737.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

(56) References Cited

OTHER PUBLICATIONS

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
D. Trossen and G. Parisis, "Designing and realizing and information-centric internet", IEEE Communications Magazing, vol. 50, No. 7, pp. 60-67, Jul. 2012.
Gasti, Paolo et al., 'DoS & DDoS in Named Data Networking', 2013 22nd International Conference on Computer Communications and Networks (ICCCN), Aug. 2013, pp. 1-7.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., 'NLSR: Named-data Link State Routing Protocol', Aug. 12, 2013, ICN 2013, pp. 15-20.
Nadeem Javaid, "Analysis and design of quality link metrics for routing protocols in Wireless Networks", PhD Thesis Defense, Dec. 15, 2010, Universete Paris-Est.
Examination Report in corresponding European application No. 15160678.7, dated Dec. 18, 2017, 9 pages.

* cited by examiner

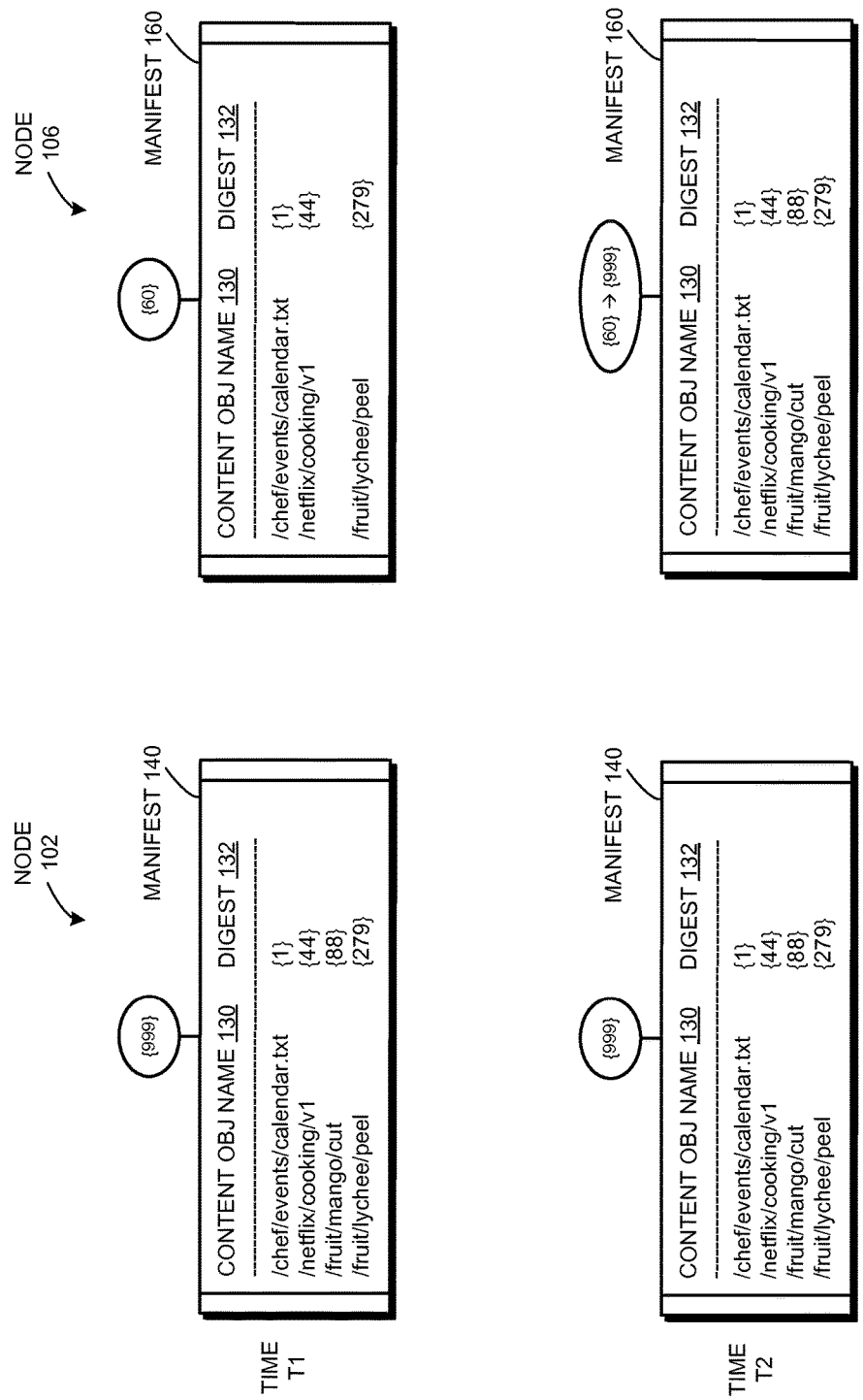

COLLECTION SYNCHRONIZATION USING EQUALITY MATCHED NETWORK NAMES

BACKGROUND

Field

This disclosure is generally related to data synchronization. More specifically, this disclosure is related to executing synchronization of collections between peers on a network using exact match names.

Related Art

In many computing applications, it is often important for peers on a network to synchronize their respective collections of data. The proliferation of digital content creates a vast number of collections which require reconciliation. Content-centric network (CCN) architectures have been designed to facilitate accessing and processing such digital content. A CCN includes entities, or nodes, such as network clients, forwarders (e.g., routers), and content producers, which communicate with each other by sending "interest" packets for various content items and receiving "content object" packets in return. CCN interests and content objects are identified based on a unique name, which is typically a hierarchically structured variable length identifier (HSVLI) which comprises contiguous name components ordered from a most general level to a most specific level.

A current CCN synchronization protocol uses a longest-prefix match method, where an interest in "/parc/events/" will match both "/parc/events/calendar.txt" and "/parc/events/conference.txt." This current synchronization protocol is based on responses that extend the name of an interest. This synchronization protocol is described in the following applications:

U.S. patent application Ser. No. 13/720,736, entitled "DYNAMIC ROUTING PROTOCOLS USING DATABASE SYNCHRONIZATION," by inventors Van L. Jacobson and Marc E. Mosko, filed 19 Dec. 2012 (hereinafter "U.S. patent application Ser. No. 13/720,736"); and U.S. patent application Ser. No. 13/681,306, entitled "DATA TRANSPORT BY NAMED CONTENT SYNCHRONIZATION," by inventors Van L. Jacobson and Marc E. Mosko, filed 19 Nov. 2012 (hereinafter "U.S. patent application Ser. No. 13/681,306");

the disclosures of which are herein incorporated by reference in their entirety.

As CCN architectures evolve, there is a need for a synchronization protocol that allows the use of exact name match, rather than the current longest-prefix match. In such a new architecture, the current CCN synchronization protocol will not work.

SUMMARY

One embodiment provides a system that facilitates the synchronization of collections of data between a local and a remote node by using exact match names. During operation, a local node receives an advertisement corresponding to a remote manifest at a remote node. A manifest represents a collection of content objects at a node. In some embodiments, a manifest corresponds to a root hash value that identifies the content objects of the collection. The local node determines that the local manifest and the remote manifest both indicate the same collection of content objects. The local node then determines if the content of the collections are different by comparing the root hash value of the local manifest with the root hash value of the remote manifest. Responsive to determining that the root hash values of the manifests are different, the local node retrieves the remote manifest by sending a request for the remote manifest. The local node determines which content objects identified in the remote manifest are different from the content objects identified in the local manifest. The local node transmits a set of interests for the content objects that are different and receives the requested set of content objects, thereby facilitating the synchronization of content objects associated with the manifests at both the local and the remote node.

In another embodiment, the local node sends a request for a remote manifest by sending a set of interests based on a chunking protocol, where each interest corresponds to a numbered chunk of the manifest.

In another embodiment, the local node transmits a set of interests for the content objects that are different, based on one or more of the following: a hash value of the content object; and a name of the content object as indicated in the manifest.

In some embodiments, the name for the content object is a hierarchically structured variable length identifier (HSVLI) which comprises contiguous name components ordered from a most general level to a most specific level, and where the name further indicates one or more of: a time that the content object was modified; and a sequence number based on a time that the content object was modified.

In some embodiments, the local node determines whether the content object in the remote manifest is more recent than the content object in the local manifest, based on one or more of: a time that the content object was modified, where a later time indicates a more recent version of the content object; a sequence number based on a time that the content object was modified, where a greater sequence number indicates a more recent version of the content object; and an ordering of the names of the content objects, where an implicit sort order indicates a more recent version of the content object.

In some embodiments, responsive to determining that the modified time of the content object in the remote manifest is more recent than the modified time of the corresponding content object in the local manifest, the system updates the value of the content object in the local manifest with the value of the content object in the remote manifest.

In some embodiments, responsive to determining that the modified time of the content object in the remote manifest is less recent than the modified time of the corresponding content object in the local manifest, the system inserts the corresponding value and modified time of the content object in the remote manifest into a history field of the content object in the local manifest.

In some embodiments, a packet sent or received by the local node indicates one or more of: a routable prefix that identifies the manifest; an identifier to determine that the packet corresponds to a transfer of data; a root hash value of the manifest; a number corresponding to a numbered chunk based on a chunking protocol; a hash of the content object; and a name of the content object in the manifest.

In some embodiments, a local node transmits an advertisement corresponding to a manifest, where the manifest represents a collection of content objects at a node. The local node transmits the manifest to a remote node in response to receiving a request for a manifest. The local node transmits a requested content object associated with the manifest to a remote node.

In some embodiments, an interest corresponding to the transmitted advertisement indicates one or more of: a routable prefix that identifies the manifest; an identifier to determine that the interest corresponds to an advertisement of the manifest; and a root hash value of the manifest.

BRIEF DESCRIPTION OF THE FIGURES

FIG. 6B presents tables depicting the format of two manifests during synchronization, where the local manifest is missing a content object from the remote manifest, in accordance with an embodiment of the present invention.

In the figures, like reference numerals refer to the same figure elements.

DETAILED DESCRIPTION

Figure 1:
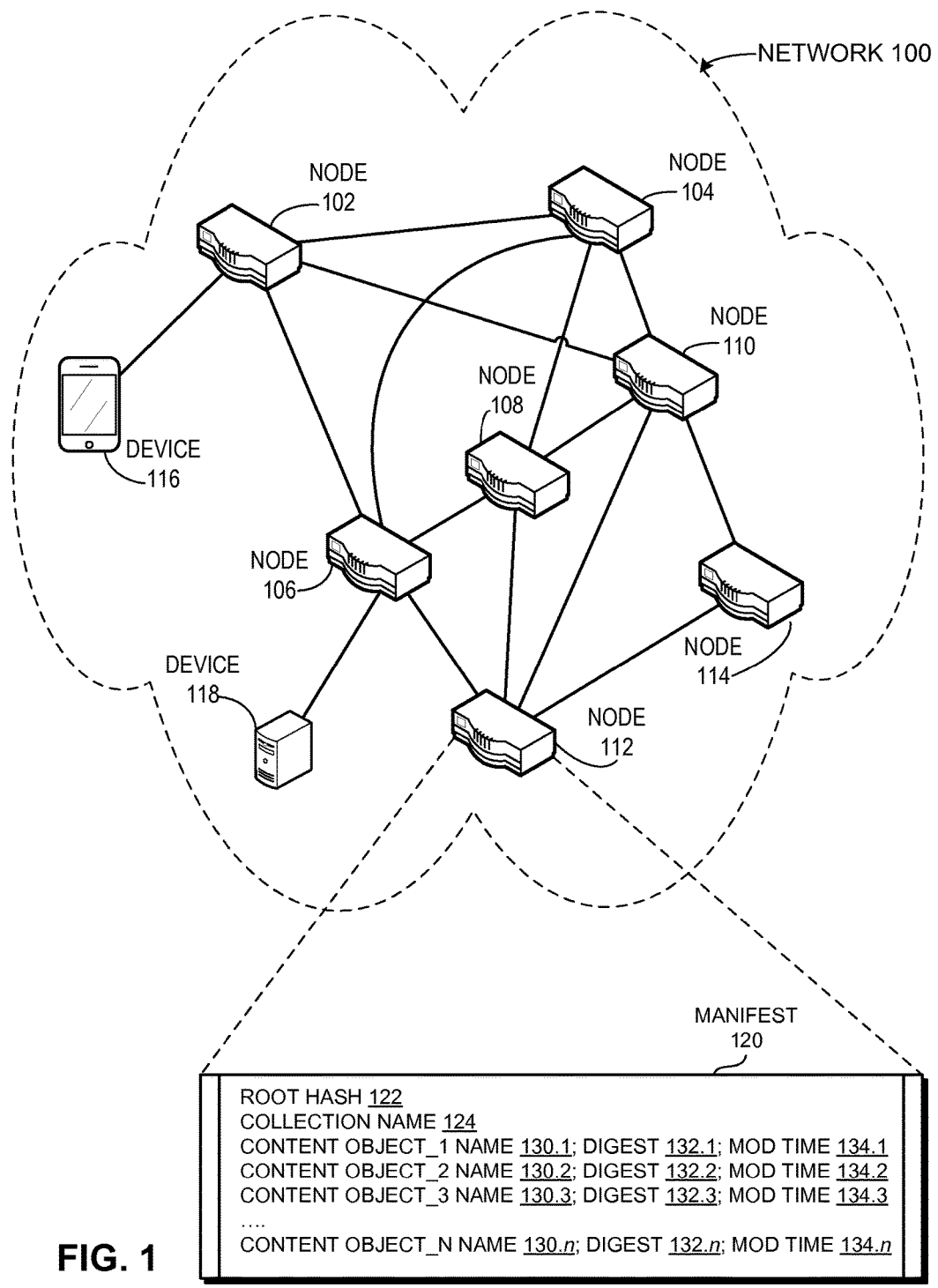
FIG. 1 illustrates an exemplary computer system that facilitates the synchronization of manifests between nodes in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which facilitates the synchronization of manifests between nodes on a network by using exact match names. In the following description of embodiments of the present invention, the relevant CCN entities are a local node and a remote node, although the roles can be reversed. Each of the local and remote nodes is associated with a manifest, which represents a collection of content objects at a node. A manifest is identified by a specific prefix, such that two manifests with the same prefix correspond to the same collection of content objects.

In some embodiments, the manifest is an ordered list identifying a collection of content objects. Each content object in a collection is identified by its name and corresponding digest, where the digest is the hash value of the content object. In some embodiments, each content object is also identified by a modified time which indicates the time that the content was modified. For the purposes of this description, the manifest is described as an ordered list, but other embodiments include the manifest structured as a synchronization tree, which contains content objects as well as nested collections of content objects. The system generates a root hash value for the manifest. The root hash value is an additive hash value based on the hash values of the individual content objects of the collection. The root hash value of the manifest is a unique identifier for the manifest.

The system can synchronize the collections in a local manifest with the contents in a local manifest using exact match names. A remote node advertises a hash of its manifest. A local node receives the advertisement and determines that the advertised remote manifest corresponds to a local manifest, where the remote manifest and the local manifest correspond to the same collection of content objects. The local node determines whether the contents of the local manifest are synchronized with the contents of the remote manifest by comparing the root hash value of the local manifest with the root hash value of the remote manifest. If they do not match, then the local node retrieves the remote manifest by sending a request for the remote manifest to the remote node. In some embodiments, the local node sends a set of interests based on a chunking protocol, and each interest corresponds to a numbered chunk of the manifest. In some embodiments, the remote node can advertise the number of chunks corresponding to its manifest. The local node, in possession of the remote manifest, determines which content objects indicated in the remote manifest are different from the content objects indicated in the local manifest. Subsequently, the local node transmits a set of interests for the content objects that are different, where the interest includes the name of the requested content object. In some embodiments, the interest also includes the corresponding hash value of the requested content object. In this manner, the system uses an exact name match to request and receive the set of different content objects.

In some embodiments, the manifest is transmitted using a structured technique, such as the rolling hash technique in the rsync protocol, rather than sending the complete manifest.

In some embodiments, a content object in a collection is further identified by a corresponding modified time, which indicates the time the content object was modified. For each content object that is determined to be different, the local node determines whether the modified time of the content object in the remote manifest is more or less recent than the corresponding content object in the local manifest. If the remote content object corresponds to a more recent version, then the local node updates the value of the content object in the local manifest with the value of the content object from the remote manifest. A description of how to remove, or "white-out", a content item from a data collection is contained in U.S. patent application Ser. No. 13/681,306, previously incorporated by reference.

In some embodiments, the name of the content object is a hierarchically structured variable length identifier (HSLVI) and indicates a version number or timestamp or implicit sort order, which is used in lieu of a modified time in the manifest to determine the most recent version of a content object.

In some embodiments, if the remote content object corresponds to a version that is less recent, the system can determine whether to retain the history by inserting the value of the content object from the remote manifest in a history field of the corresponding content object in the local manifest. The system updates the values accordingly for each content object that is determined to be different. In this manner, the system synchronizes the manifest at a local node with the manifest at a remote node.

In some embodiments, the network clients, network nodes (e.g., forwarders such as routers), and publishers communicate over an information-centric network (ICN). In ICN, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data network (NDN) or a content-centric network (CCN) are examples of ICN architecture; the following terms describe elements of an NDN or CCN architecture:

Content Object:

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in an ICN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

Exemplary Network and Manifest

FIG. 1 illustrates an exemplary network 100 that facilitates the synchronization of manifests between nodes in a content centric network (CCN), in accordance with an embodiment of the present invention. Network 100 can include a client device 116, a content producing device 118, and a router or other forwarder at nodes 102, 104, 106, 108, 110, 112, and 114. Nodes 102-114 can each contain one or more manifests. For example, node 112 contains a manifest 120. Manifest 120 comprises a collection name 124 and an ordered list of content objects identified by one or more of the following: a content object name 130.1-130.$n$; a digest 132.1-132.$n$, and a modified time 134.1-134.$n$. The digests 132.1-132.$n$ comprise a hash value of the content object identified respectively by names 130.1-130.$n$. The digest can be a SHA-256 hash of the content object, where the likelihood of a hash collision (where the one-way hash of two different content objects results in the same value) is sufficiently low such that the digest is a unique identifier for the content object. Manifest 120 also includes a root hash 122, which is an additive hash value based on the hash values 132.1-132.$n$ of the individual content objects of the collection. Root hash 122 is a unique identifier for manifest 120 and represents the content objects in the collection.

In some embodiments, a manifest indicates a name and a corresponding digest, but does not indicate a modified time. Such a system can include, e.g., a file server where prior versions of a text file are important and thus retained by the system. In other embodiments, a manifest indicates a name, a corresponding digest, and a modified time. The system can use the modified time to determine which version of the content item should be retained. For example, if the content items indicate a link state, then the system does not need information relating to previous versions. In this case, only the content object with the most recent modified time is retained.

Any two nodes in a network can contain a manifest that represents the same collection of data, where the manifests can be synchronized using the methods described herein.

The terms "local node" and "remote node" can apply to any node in a content-centric network (CCN) and are used in this disclosure to differentiate between two nodes in a CCN.

Structure of Names

The synchronization of manifests representing the same collection of data between two nodes is based on a three part name. The first part is a routable prefix that identifies the collection, such as "/a/b." The second part contains an identification of the relevant name space, and is either "/adv" for advertisements or "/data" for data transfers. The third part is the hash value or content being advertised or transferred. Thus, a CCN name is of the form:

/collection_prefix/adv_or_data/protocol_data

An example of an interest sending a hash advertisement is:

/a/b/adv/<roothash>

A local node receiving this advertisement and containing a local manifest with the same routable prefix "/a/b" retrieves the advertised manifest in chunks 0, 1, . . . up to the ending chunk number m based on a chunking protocol. Such an interest looks like:

/a/b/data/<roothash>/<chunk number>

Based on the entries in the retrieved manifest, the system determines which content objects identified in the retrieved manifest are different from the content objects identified in the local manifest. The system retrieves the different content objects based on the name of the content object:

/a/b/data/<name of content object>

In some embodiments, the system retrieves the different content objects based on the hash value of the requested content object:

/a/b/data/<hash(content object)>

In some embodiments, the system retrieves the different content objects based on the name in the manifest. This technique allows the system to retrieve any cached copy of the object rather than using the name of the content under the collection's namespace. For example, to retrieve the first item from Manifest 140 in FIG. 6B, the system would send an Interest for the name and digest:

/chef/events/calendar.txt, digest={1}

Communication and Synchronization of Manifests Between Two Nodes

Figure 2:
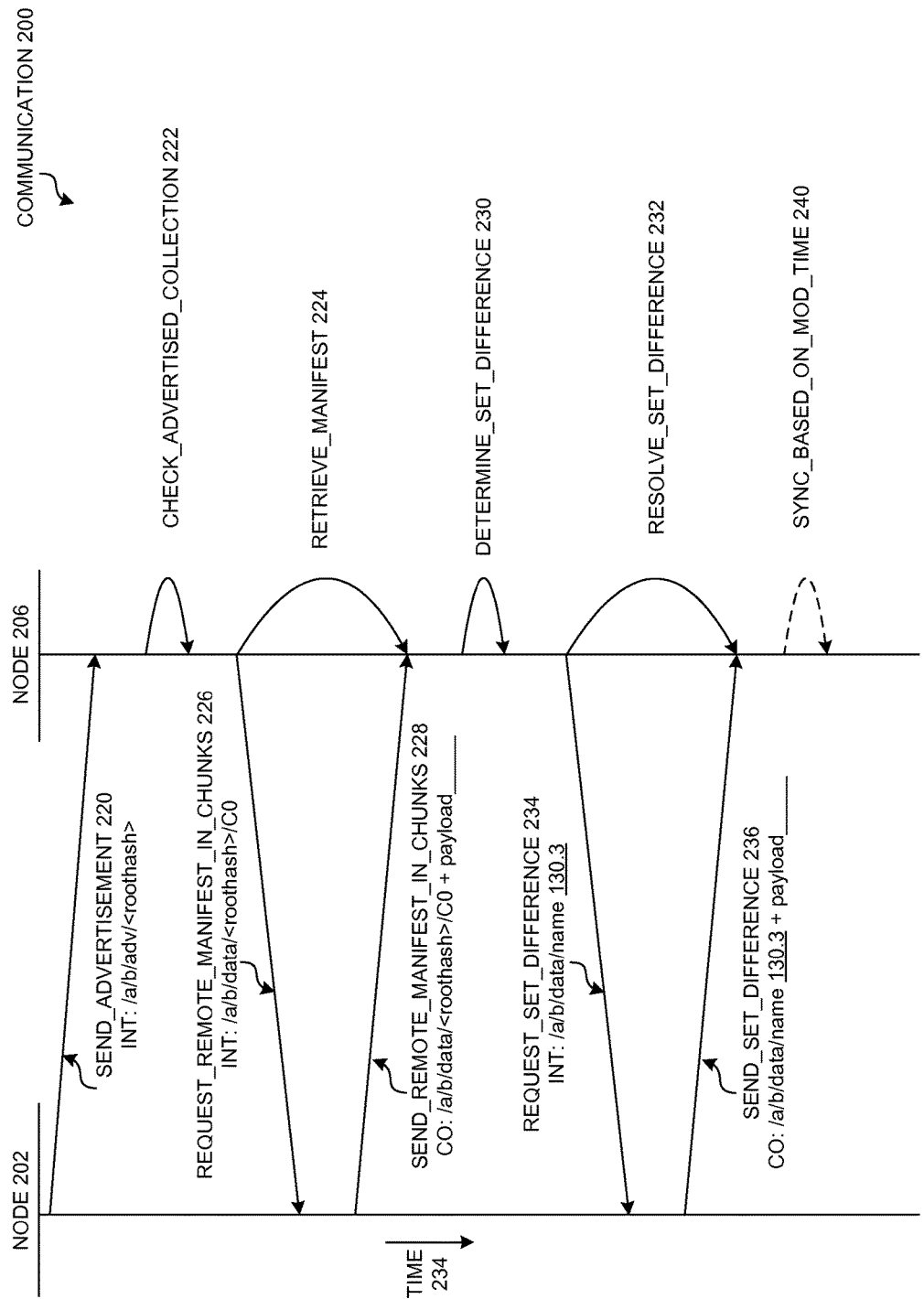
FIG. 2 illustrates exemplary communication between a local node and a remote node, in accordance with an embodiment of the present invention.

FIG. 2 illustrates an exemplary communication 200 between a node 202 (remote node) and a node 206 (local node), in accordance with an embodiment of the present invention. Node 202 and node 206 each contain a manifest with the same routing prefix, or collection name, "/a/b." Remote node 202 transmits a send_advertisement interest 220, which is a hash advertisement containing the root hash value of its manifest identified by collection name "/a/b." The interest takes the form: "/a/b/adv/<roothash>." Local node 206 receives the advertised interest and performs a check_advertised_collection procedure 222 to determine if node 206 contains a manifest indicating a same collection as the advertised manifest, based on the same collection prefix ("/a/b"). Then, local node 206 determines if the root hash of its local manifest is different from the root hash of the remote manifest. Differing hash values indicate that the collections need to be synchronized with each other. Local node 206 then performs a retrieve_manifest procedure 224, by sending a set of interests for the manifest. The set of interests is divided into chunks based on a chunking protocol. The interests are sent in a request_manifest_in_chunks message 226, and are of the form: "/a/b/data/<roothash>/C0", "/a/b/data/<roothash>/C1," "/a/b/data/<roothash>/C2," etc., where "C0" represents the first chunk of the manifest, and so on. In some embodiments, the advertising node can include the number of chunks required to transfer its manifest. In a send_manifest_in_chunks message 228, remote node 202 sends the requested manifest back in response to the set of interests. The requested content objects take the form: "/a/b/data/<roothash>/C0+payload" where the payload contains the requested chunk of the manifest.

Local node 206, in possession of the remote manifest, performs a determine_set_difference procedure 230. In some embodiments, the result of this procedure is a list of content objects identified by name. In other embodiments, the result is a list of content objects identified by their corresponding digest. Local node 206 then transmits a request_set_difference interest 234 for each content object determined to be different. The interest takes the form, e.g.: "/a/b/data/name 130.3". Local node 206 receives the requested content object when remote node 202 transmits a send_set_difference content object 236, where the requested content object takes the form: "/a/b/data/name 130.3+payload." Thus, local node 206 requests and receives all content objects determined to be different such that the contents of the local manifest are synchronized with the contents of the remote manifest. In some embodiments, local node 206 performs a sync_based_on_mod_time procedure 240, which is described below in relation to FIG. 4.

Figure 3:
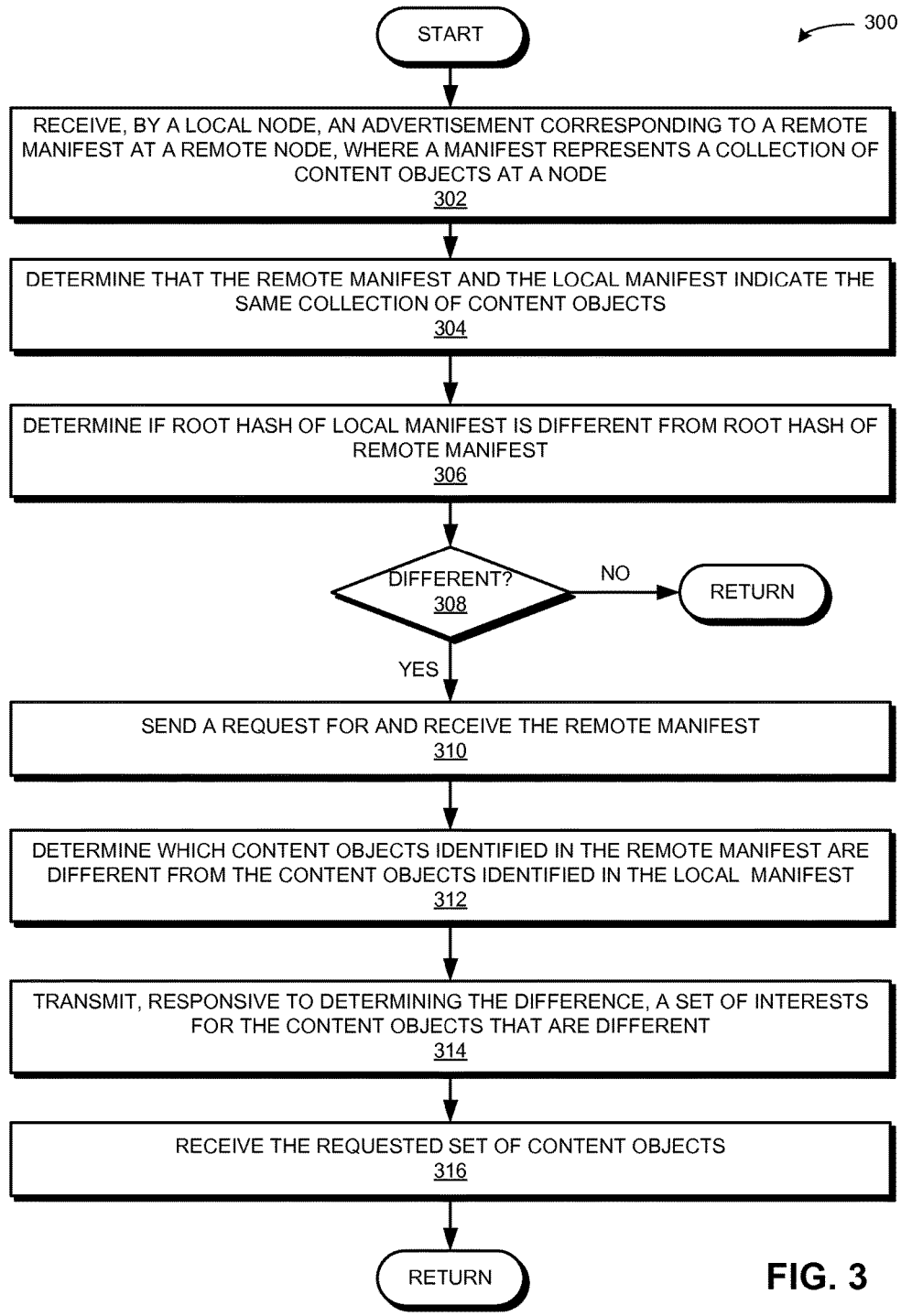
FIG. 3 presents a flow chart illustrating a method for synchronizing content associated with a remote manifest and a local manifest, in accordance with an embodiment of the present invention.

FIG. 3 presents a flow chart 300 illustrating a method for synchronizing content associated with a remote manifest and a local manifest, in accordance with an embodiment of the present invention. In the below description, the local node is depicted as node 106 in FIG. 2 and the remote node is depicted as node 102 in FIG. 2. A local node receives an advertisement corresponding to a remote manifest at a remote node (operation 302). A manifest represents a collection of content objects at a node. The local node determines that the remote manifest and the local manifest indicate the same collection of content objects (operation 304, corresponding to check_advertised_collection procedure 222 in FIG. 2). In some embodiments, the local node determines if the manifests indicate the same collection by comparing the collection name, or routing prefix, of the manifests. The local node then determines if the root hash value of its local manifest is different from the root hash value of the remote manifest (operation 306). The root hash value of a manifest is a unique identifier for the manifest, and comprises an additive hash value of the digests of the content objects represented in the manifest. If the root hash value of the local manifest is the same (decision 308), then the procedure returns.

If the root hash value of the local manifest is not the same as the root hash value of the remote manifest (decision 308), this indicates that the local and remote manifests, which represent the same collection, are not synchronized and need to be reconciled. The local node downloads or transfers the remote manifest by sending a request for, and receiving in response to the request, the remote manifest (operation 310, corresponding to retrieve_manifest procedure 224 in FIG. 2).

The local node determines which content objects identified in the remote manifest are different from the content objects identified in the local manifest (operation 312, corresponding to the determine_set_difference operation 230 in FIG. 2). In some embodiments, the local node determines the set difference by comparing the digests of the content objects identified in the local manifest with the digests of the same named content objects identified in the remote manifest. The local node transmits a set of interests corresponding to the determined different set of content objects (operation 234), and receives the requested content objects in return (operation 236). This corresponds to the resolve_set_difference operation 232 shown in FIG. 2. Thus, the contents of the local manifest are synchronized with the contents of the remote manifest.

If the local node has changes, the local node advertises the new root hash value. It can do so immediately, or schedule a next advertisement based on network or other timing considerations. For example, the local system can advertise its root hash at least once per second, but no more than four times a second. Therefore, during reconciliation, as the root hash changes due to updates, the system can advertise up to four changes per second. Otherwise, in a steady state, it can advertise once per second.

Synchronization Based on Modified Time

Figure 4:
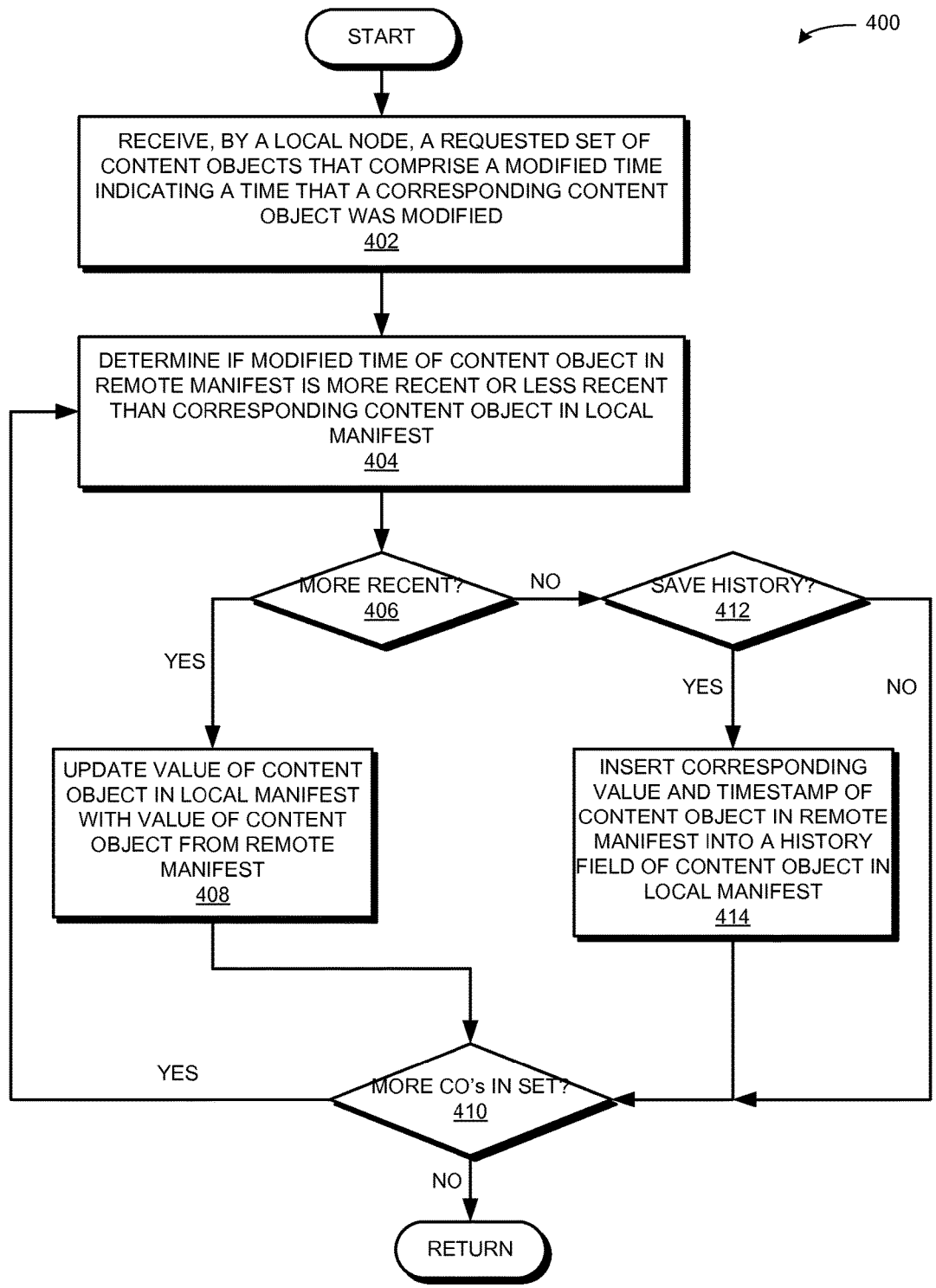
FIG. 4 presents a flow chart illustrating a method for synchronizing content associated with a remote manifest and a local manifest based on a modified time, in accordance with an embodiment of the present invention.

FIG. 4 presents a flow chart 400 illustrating a method for synchronizing content associated with a remote manifest and a local manifest based on a modified time, in accordance with an embodiment of the present invention. Note that the synchronization of content can also be based on a sequence number associated with a content object, where a greater sequence number indicates a more recent version of the content object. Synchronization of content can also be based on an ordering of the names of the content objects, where an implicit sort order indicates a more recent version of the content object. Flowchart 400 depicts an exemplary method based on the modified time of a content object, which is depicted as sync_based_on_mod_time operation 240 in FIG. 2. Based on the previously determined set difference, a local node receives a requested set of content objects that include a modified time indicating a time that a corresponding content object was modified (operation 402). For each content object, the local node determines if the modified time of the content object in the remote manifest is more recent or less recent than the corresponding content object in the local manifest (operation 404). If the modified time of the content object from the remote manifest is more recent (decision 406), then the system updates the value of the content object in the local manifest with the value of the content object from the remote manifest (operation 408). In some embodiments, the local node can determine whether to retain the value of its (less recent) content object in the local manifest, by inserting a corresponding value and modified time of the (less recent) content object into a history field in the local manifest before updating the value of the content object in the local manifest. If there are more content objects in the set that need to be retrieved (decision 410), then the system returns to operation 404. If not, then the system has finished retrieving the necessary content objects.

If the modified time of the content object from the remote manifest is less recent than the corresponding content object in the local manifest (operation 406), then the system determines whether to save the value of the (less recent) content object from the remote manifest (decision 412), by inserting a corresponding value and modified time of the (less recent) content object into a history field in the local manifest (operation 414). If there are more content objects in the set that need to be retrieved (decision 410), then the system returns to operation 404. If not, then the system has finished retrieving the necessary content objects. Thus, all content objects determined to be different have been updated, and possibly retained or saved in a history field of the local manifest, such that the contents of the local manifest are synchronized with the contents of the remote manifest.

Transmitting Advertisement, Manifest, and Contents for Synchronization

Figure 5:
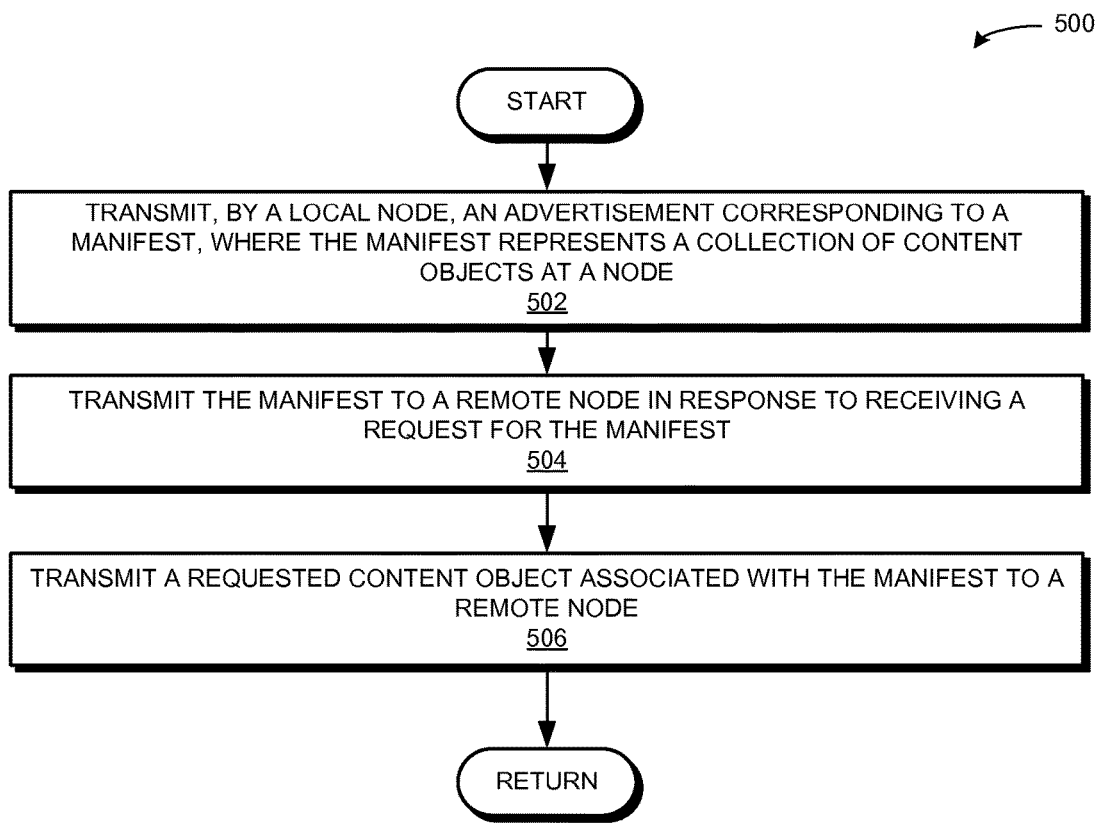
FIG. 5 presents a flow chart illustrating a method for transmitting an advertisement corresponding to a manifest, in accordance with an embodiment of the present invention.

FIG. 5 presents a flow chart 500 illustrating a method for transmitting an advertisement corresponding to a manifest, in accordance with an embodiment of the present invention. The node in FIG. 5 is described as a local node because it transmits packets to a remote node. Note that the local node in FIG. 5 corresponds to node 202 in FIG. 2, which has been previously referred to as remote node 202. Recall that any node in a network such as a content-centric network (CCN) can be referred to as a remote node or a local node.

A local node transmits an advertisement corresponding to a manifest, where the manifest represents a collection of content objects at a node (operation 502, corresponding to send_advertisement message 220 in FIG. 2). This advertisement is an interest that is akin to a beacon, and, based on the "/adv" name space used, does not request any content in return. Upon receiving a request from a remote node for the manifest, the local node transmits the manifest to the remote node (operation 504, corresponding to receiving request_manifest_in_chunks interest 226 and send_manifest_in_chunks message 228 in FIG. 2). Upon receiving a request from a remote node for a content object identified in the local manifest, the local node transmits the requested content object to the requesting remote node (operation 506, corresponding to receiving request_set_difference interest 234 and send_set_different message 236 in FIG. 2).

Manifest Contents During Synchronization

Figure 6A:
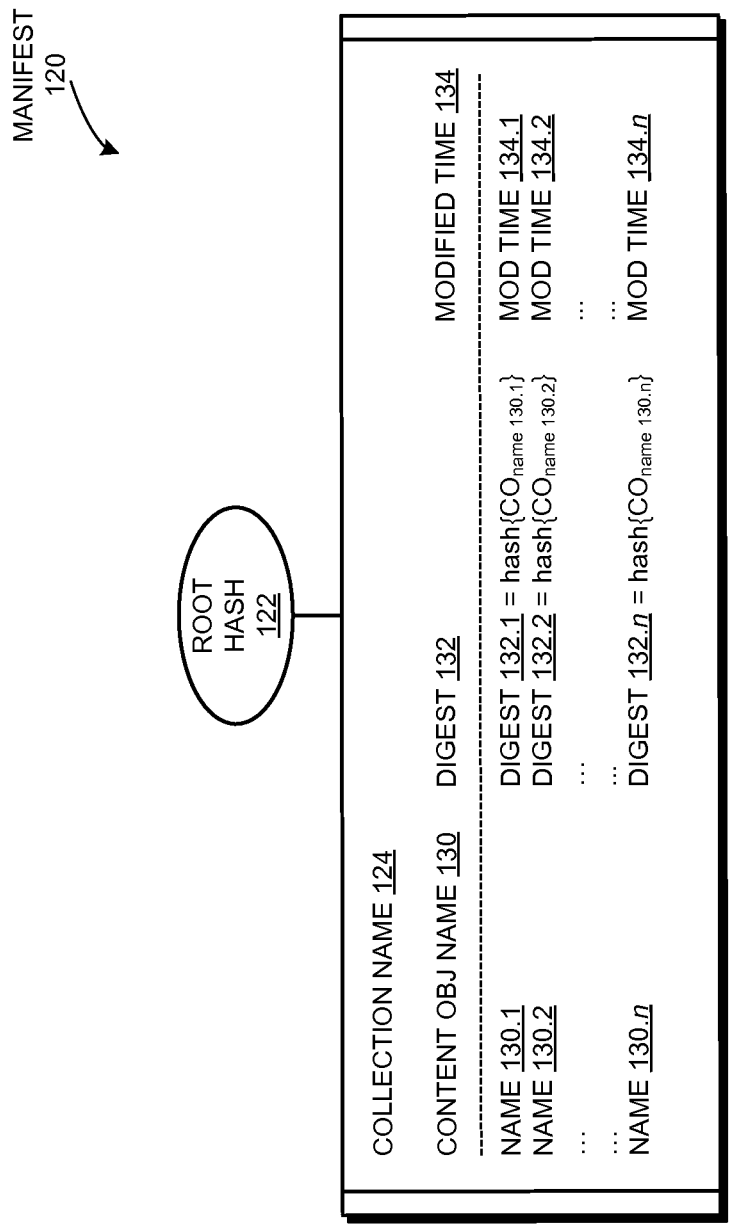
FIG. 6A presents a table depicting the format of a manifest and the content objects represented in the collection, in accordance with an embodiment of the present invention.

FIG. 6A presents a table depicting the format of a manifest 120 and the content objects represented in the collection, in accordance with an embodiment of the present invention. Manifest 120 comprises an ordered list of content objects identified by a collection name 124 and one or more of the following: a content object name 130.1-130.$n$; a digest 132.1-132.$n$; and a modified time 134.1-134.$n$. The digests 132.1-132.$n$ comprise a hash value of the content object identified respectively by names 130.1-130.$n$. Manifest 120 also includes a root hash 122, which is an additive hash value based on the hash values 132.1-132.$n$ of the individual content objects of the collection. Root hash 122 of manifest 120 is a unique identifier for manifest 120.

As described in relation to FIG. 1, manifest 120 can indicate a name and corresponding digest for each content object represented in the collection. In some embodiments, manifest 120 can also include a modified time for each content object represented in the collection. The use of the modified time field depends on the underlying application or service being performed. Note that manifest 120 indicates collection name 124. The manifests depicted in FIGS. 6B-E also include a collection name, but because the exemplary manifests comprise the same collections of data, the collection name is not included in FIGS. 6B-6E.

FIGS. 6B-6E depict two nodes, node 102 and node 106, which each contain a manifest. In this example, node 102 is the remote node and node 106 is the local node. Local node 106 contains a manifest 160, and remote node 102 contains a manifest 140. Manifests 140 and 160 contain the same collection name, or routing prefix, and thus represent the same collection of content objects or data. Time is indicated by the labels T1, T2, etc., and the contents of manifests 140 and 160 are depicted in relation to these time labels.

Recall that a manifest is further identified by a root hash value, illustrated as root hash 122 in FIG. 6A, which is an additive hash value based on the digests of the individual content objects of the collection. In the below examples, the root hash value and the digests are indicated as a number in brackets, e.g., "{999}", though the number can be much larger than this. In addition, both the digests of the content objects and the exemplar root hash values of manifest 140 and manifest 160 that change over time are depicted only as sample representations of additive hash values.

Local Manifest Missing a Content Object from Remote Manifest

FIG. 6B presents tables depicting the format of two manifests during synchronization, where the local manifest is missing a content object from the remote manifest, in accordance with an embodiment of the present invention. At time T1, local node 106 receives a hash advertisement from remote node 102 of manifest 140, with a root hash value of {999}. Local node 106 determines that its manifest 160 represents the same collection of data as remote manifest 140 and retrieves manifest 140. Local node 106 determines that local manifest 160, with a root hash value of {60}, is not synchronized with remote manifest 140, which has a root hash value of {999}. Local node 106 then determines the set difference between its local manifest 160 and remote manifest 140. In this example, manifest 160 is missing the content object identified by the name of "/fruit/lychee/peel," so local node 106 sends an interest to remote node 102 for the content object by that name. Remote node 102 returns the requested content object. At time T2, local node 106 updates it manifest 160 with the missing content object. Based on the contents of manifest 160 at time T2, the system generates a new root hash value for manifest 160, which now equals the root hash value of the remote manifest. This is depicted by the root hash value of manifest 160 at time T2: {60}→{999}. Thus, the local manifest and the remote manifest have synchronized their collections and both contain the same root hash value of {999}.

Figure 6C:
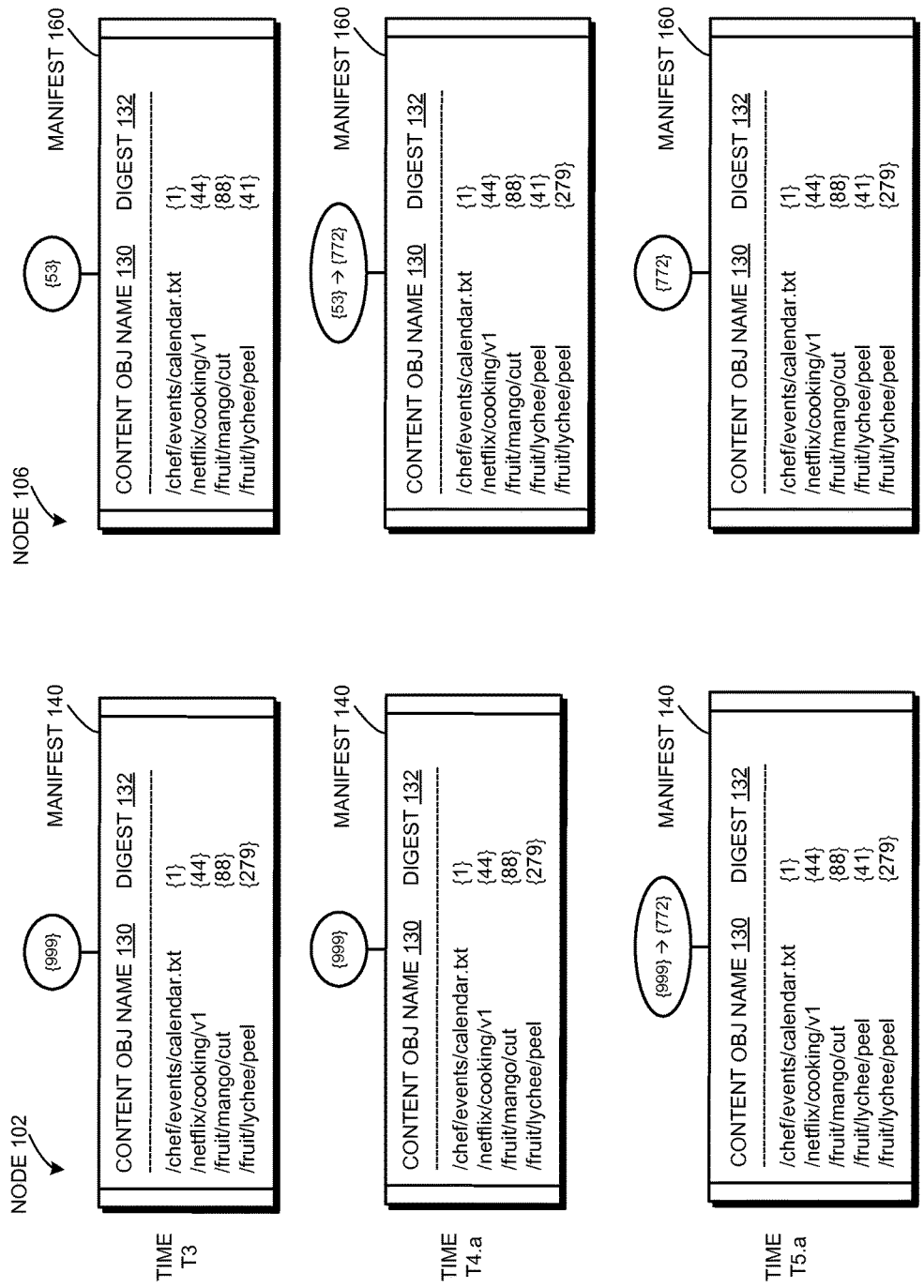
FIG. 6C presents tables depicting the format of two manifests during synchronization, where the digest of a same named content object in the local manifest is different from the digest in the remote manifest, and where the remote node advertises its manifest, in accordance with an embodiment of the present invention.

Local and Remote Manifests Contain Content Object with Same Name, but Different Digest: Local Node Retrieves Manifest First FIG. 6C presents tables depicting the format of two manifests during synchronization, where the digest of a same named content object in the local manifest is different from the digest in the remote manifest, and where the remote node sends the advertisement and the local node retrieves the remote manifest, in accordance with an embodiment of the present invention. At time T3, local node 106 receives a hash advertisement from remote node 102 of manifest 140, with a root hash value of {999}. Local node 106 determines that its manifest 160 represents the same collection of data as remote manifest 140 and retrieves manifest 140. Local node 106 determines that local manifest 160, with a root hash value of {53}, is not synchronized with remote manifest 140, which has a root hash value of {999}. Local node 106 then determines the set difference between its local manifest 160 and remote manifest 140. In this example, manifest 160 is missing the content object identified by the name of "/fruit/lychee/peel" with a digest of {279}, so local node 106 sends an interest to remote node 102 for the content object based on that name and digest. Remote node 102 returns the requested content object. At time T4.a, local node 106 updates it manifest 160 with the missing content object. Based on the contents of manifest 160 at time T4.a, the system generates a new root hash value for manifest 160. This is depicted by the root hash value of manifest 160 at time T4.a: {53}→{772}. However, manifest 140, with its original root hash value of {999}, is now out of sync with manifest 160, which has the new root hash value of {772}.

Subsequently, remote node 102 receives a hash advertisement from local node 106 of manifest 160, with the new root hash value of {772}. Remote node 102 determines that its manifest 140 represents the same collection of data as manifest 160 and retrieves manifest 160. Remote node 102 determines that manifest 140, with a root hash value of {999}, is not synchronized with manifest 160, which has a root hash value of {772}. Remote node 102 then determines the set difference between its manifest 140 and manifest 160. In this example, manifest 140 is missing the content object identified by the name of "/fruit/lychee/peel" with a digest of {41}, so remote node 102 sends an interest to local node 106 for the content object based on that name and digest. Local node 106 returns the requested content object. At time T5.a, remote node 102 updates it manifest 140 with the missing content object. Based on the contents of manifest 140 at time T5.a, the system generates a new root hash value for manifest 140. This is depicted by the root hash value of manifest 140 at time T5.a: {999}→{772}. Thus, at time T5.a, manifest 140 at node 102 is in sync with manifest 160 at node 106. Nodes 102 and 106 have synchronized their collections and both contain the same root hash value of {772}.

Figure 6D:
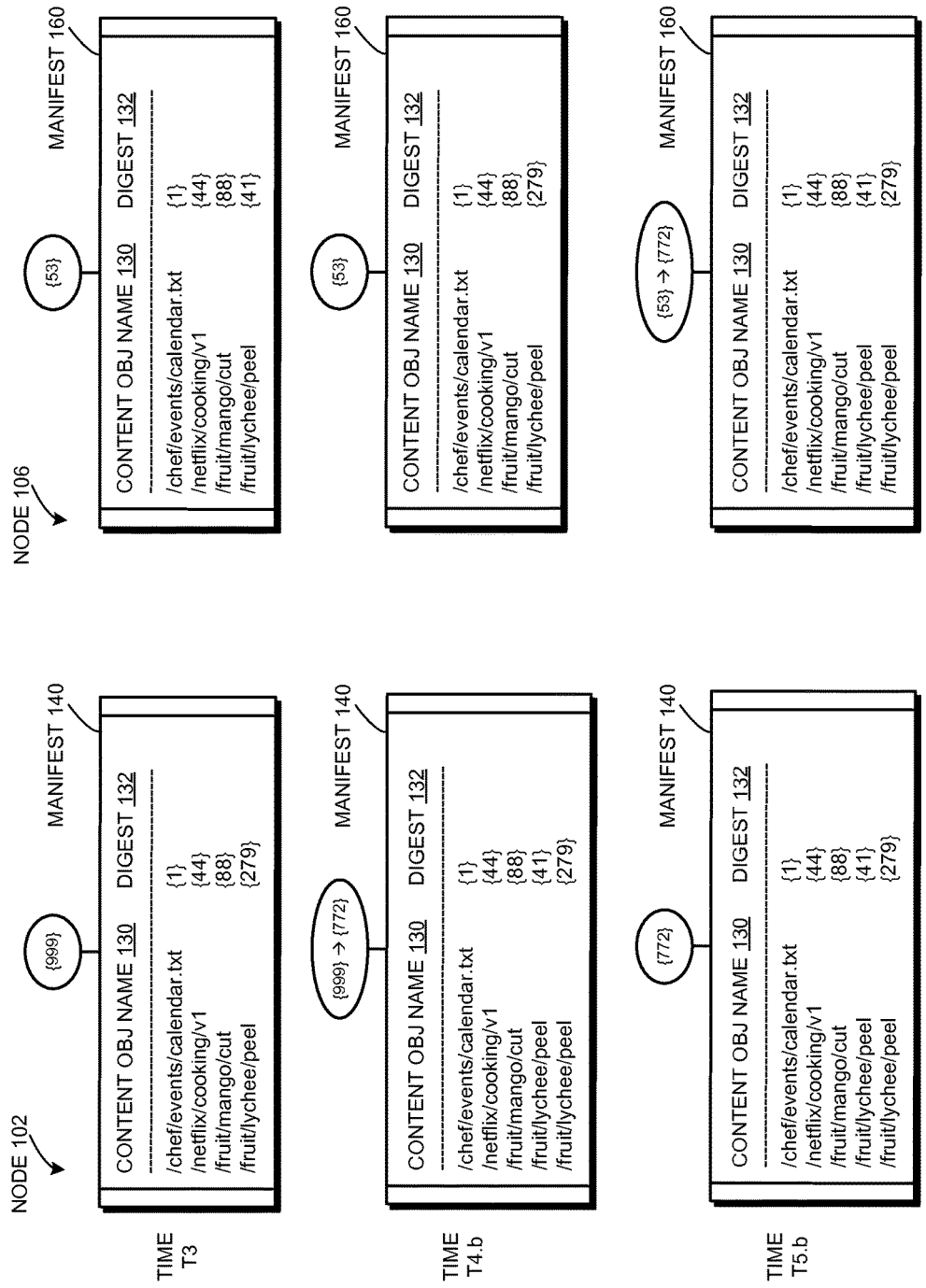
FIG. 6D presents tables depicting the format of two manifests during synchronization, where the digest of a same named content object in the local manifest is different from the digest in the remote manifest, and where the local node advertises its manifest, in accordance with an embodiment of the present invention.

Local and Remote Manifests Contain Content Object with Same Name, but Different Digest: Remote Node Retrieves Manifest First FIG. 6D presents tables depicting the format of two manifests during synchronization, where the digest of a same named content object in the local manifest is different from the digest in the remote manifest, and where the local node sends the advertisement and the remote node retrieves the local manifest, in accordance with an embodiment of the present invention. At time T3, remote node 102 receives a hash advertisement from local node 106 of manifest 160, with a root hash value of {53}. Remote node 102 determines that its manifest 140 represents the same collection of data as manifest 160 and retrieves manifest 160. Remote node 102 determines that its manifest 140, with a root hash value of {999}, is not synchronized with manifest 160, which has a root hash value of {53}. Remote node 102 then determines the set difference between its manifest 140 and manifest 160. In this example, manifest 140 is missing the content object identified by the name of "/fruit/lychee/peel" with a digest of {41}, so remote node 102 sends an interest to local node 106 for the content object based on that name and digest. Local node 106 returns the requested content object. At time T4.b, remote node 102 updates it manifest 140 with the missing content object. Based on the contents of manifest 140 at time T4.b, the system generates a new root hash value for manifest 140. This is depicted by the root hash value of manifest 140 at time T4.b: {999}→{772}. However, manifest 160, with its original root hash value of {53}, is now out of sync with manifest 140, which has a new root hash value of {772}.

Subsequently, local node 106 receives a hash advertisement from remote node 102 of manifest 140, with the new root hash value of {772}. Local node 106 determines that its manifest 160 represents the same collection of data as manifest 140 and retrieves manifest 140. Local node 106 determines that its manifest 160, with a root hash value of {53}, is not synchronized with manifest 140, which has a root hash value of {772}. Local node 106 then determines the set difference between its local manifest 160 and remote manifest 140. In this example, manifest 160 is missing the content object identified by the name of "/fruit/lychee/peel" with a digest of {41}, so local node 106 sends an interest to remote node 102 for the content object based on that name and digest. Remote node 102 returns the requested content object. At time T5.b, local node 106 updates it manifest 160 with the missing content object. Based on the contents of manifest 160 at time T5.b, the system generates a new root hash value for manifest 160. This is depicted by the root hash value of manifest 160 at time T5.b: {53}→{772}. Thus, at time T5.b, manifest 140 at node 102 is in synchronization with manifest 160 at node 106. Nodes 102 and 106 have synchronized their collections and both contain the same root hash value of {772}.

FIGS. 6C and 6D illustrate that any node can be a remote or a local node, and that the order of sending or receiving hash advertisements, manifests, and content objects determined to be different associated with the manifest may differ depending on the contents in a collection at a given time, e.g., the contents of manifests 140 and 160 at times [T3, T4.a, T5.a] and at times [T3, T4.b, T5.b]. That is, any node can send or receive a hash advertisement, transfer a manifest, and synchronize the contents of a manifest at the node using the methods described in this disclosure, thereby resulting in the synchronization of data collections at two nodes.

Synchronization Using Modified Time

Figure 6E:
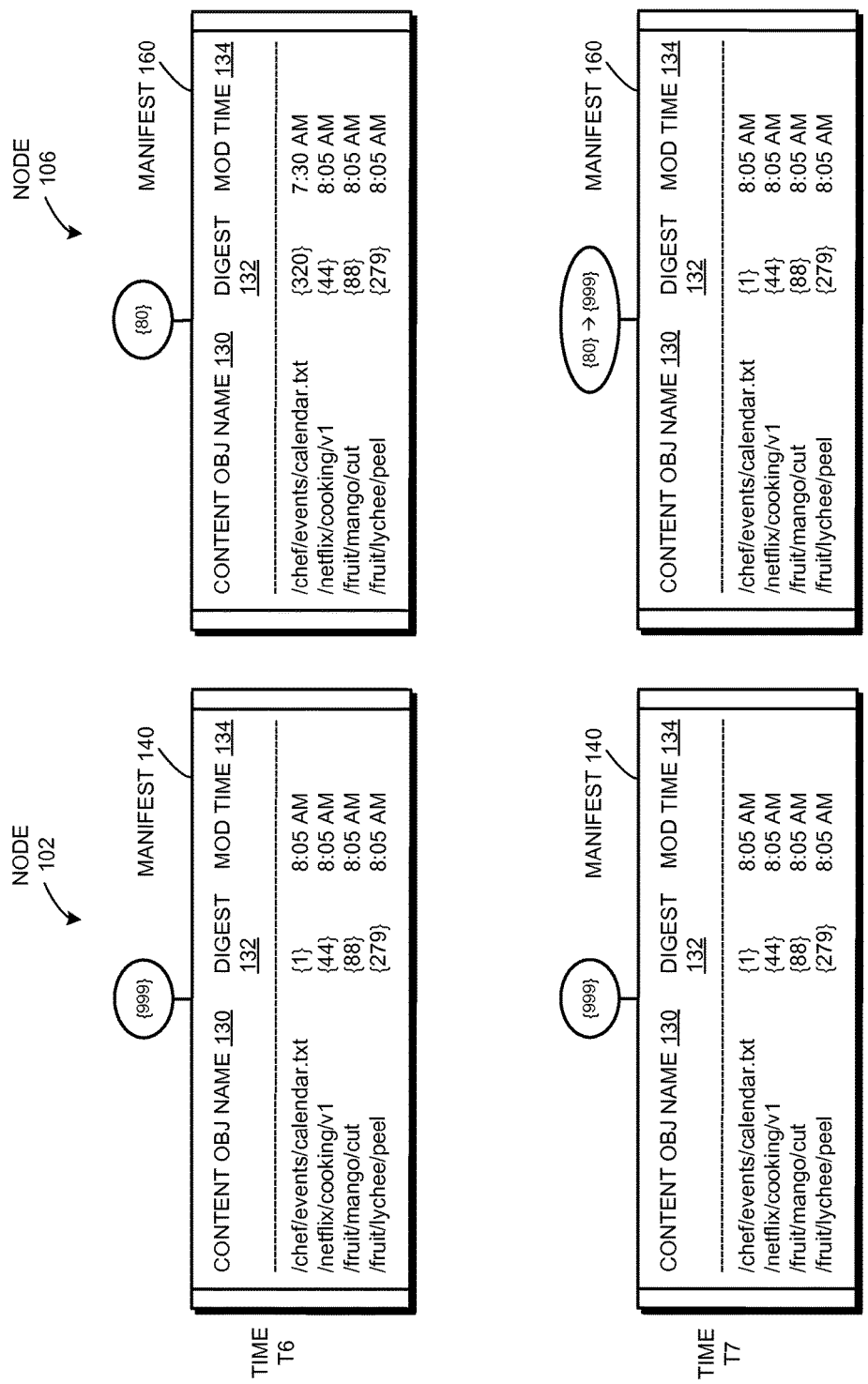
FIG. 6E presents tables depicting the format of two manifests during synchronization, when the digest and modified time of a same named content object in the local manifest is different from the digest and modified time in the remote manifest, in accordance with an embodiment of the present invention.

FIG. 6E presents tables depicting the format of two manifests during synchronization, where the digest and modified time of a same named content object in the local manifest is different from the digest and modified time in the remote manifest, in accordance with an embodiment of the present invention.

At time T6, local node 106 receives a hash advertisement from remote node 102 of manifest 140, with a root hash value of {999}. Local node 106 determines that its manifest 160 represents the same collection of data as remote manifest 140 and retrieves manifest 140. Local node 106 determines that local manifest 160, with a root hash value of {80}, is not synchronized with remote manifest 140, which has a root hash value of {999}. Local node 106 then determines the set difference between its local manifest 160 and remote manifest 140. In this example, both manifest 140 and manifest 160 indicate a modified time 134 corresponding to each content object represented in its collection. The system determines that a content object with the same name in manifest 140 and manifest 160 has a different digest and a different modified time. Note that a modified time can include information relating to the second, minute, hour, day, month, and year that a corresponding content object was modified. For simplicity, the exemplary manifests in FIG. 6E contain only a time of the day. Manifest 140 contains a content object identified by the name of "/chef/events/calendar.txt" with a digest of {1} and a modified time of 8:05 am. Manifest 160 contains a content object identified by the same name with a different digest of {320} and a different modified time of 7:30 am. Local node 106 then sends an interest to remote node 102 for the content object based on the name and digest of the different content object. Remote node 102 returns the requested content object.

Local node determines that the content object from remote manifest 140 with a modified time of 8:05 am is more recent than the content object from its local manifest 160 with a modified time of 7:30 am. So, at time T7, local node 106 updates it manifest 160 with the different and more recent content object. Based on the contents of manifest 160 at time T7, the system generates a new root hash value for manifest 160. This is depicted by the root hash value of manifest 160 at time T7: {80}→{999}. Thus, at time T7, manifest 160 at local node 106 is in sync with manifest 140 at remote node 106. Nodes 102 and 106 have synchronized their collections and both contain the same root hash value of {999}.

In some embodiments, the system will retain the previous version of the changed content object (e.g., the content object identified by name "/chef/events/calendar.txt" with a digest of {320} and a modified time of 7:30 am) in a history field of manifest 160. In other embodiments, when remote node 102 receives a hash advertisement from local node 106 of manifest 160 with a root hash of {80} and downloads the local manifest 160, remote node 102 determines that the version of the received content object identified by name "/chef/events/calendar.txt" with a digest of {320} and a modified time of 7:30 am is less recent than the version in its own manifest. In this case, manifest 140 at remote node 102 remains out of synchronization with manifest 160 at local node 106. The manifests will undergo synchronization at a later time when local node 106 receives a hash advertisement from remote node 102 of manifest 140, which contains the more recently updated content object, as described above.

Apparatus and Computer System

Figure 7:
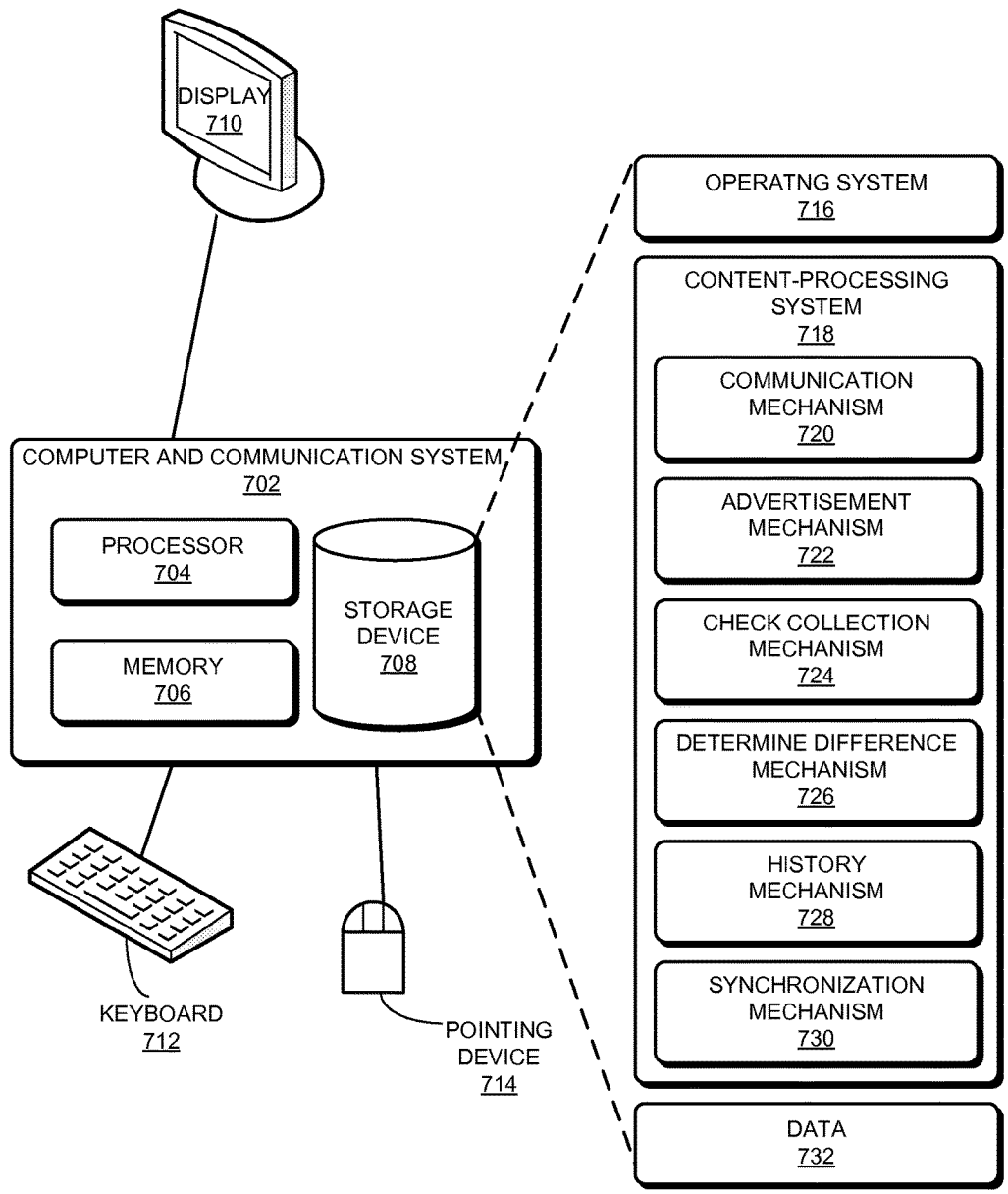
FIG. 7 illustrates an exemplary computer and communication system that facilitates synchronization of manifests in a content centric network, in accordance with an embodiment of the present invention.

FIG. 7 illustrates an exemplary computer and communication system that facilitates synchronization of manifests in a content centric network, in accordance with an embodiment of the present invention. Computer and communication system 702 includes a processor 704, a memory 706, and a storage device 708. Memory 706 can include a volatile memory (e.g., RAM) that serves as a managed memory, and can be used to store one or more memory pools. Furthermore, computer and communication system 702 can be coupled to a display device 710, a keyboard 712, and a pointing device 714. Storage device 708 can store an operating system 716, a content-processing system 718, and data 732.

Content-processing system 718 can include instructions, which when executed by computer and communication system 702, can cause computer and communication system 702 to perform methods and/or processes described in this disclosure. Specifically, content-processing system 718 may include instructions for sending an advertisement corresponding to a remote manifest of a remote node (advertisement mechanism 722). Content-processing system 718 can also include instructions for determining that a local manifest corresponds to the same collection of content objects as a remote manifest (check collection mechanism 724). Content-processing system 718 can also contain instructions for determining that the contents of the collections at the local manifest and the remote manifest are different, by comparing the root hash value of the local manifest with the root hash value of the remote manifest (check collection mechanism 724).

Content-processing system 718 can include instructions for sending a request for a remote manifest, receiving a remote manifest, sending a request for a content object associated with the remote manifest, and receiving a requested content object associated with the remote manifest (communication mechanism 720). Content-processing system 718 can also include instructions for sending a set of interests to retrieve a remote manifest, based on a chunking protocol, such that each interest corresponds to a numbered chunk of the manifest (communication mechanism 720). Content-processing system 718 can include instructions for transmitting an advertisement corresponding to a manifest, transmitting the manifest to a remote node in response to receiving a request for the manifest, transmitting a requested content object associated with the manifest to a remote node, and receiving a set of interests based on a chunking protocol, such that each interest corresponds to a numbered chunk of the manifest (communication mechanism 720).

Content-processing system 718 can further include instructions for determining a set difference between the content objects identified in a local manifest and the content objects identified in a remote manifest, where the manifests comprise the same collection of data (determine difference mechanism 726). Content-processing system 718 can also include instructions for updating, responsive to determining that the modified time of the content object in the remote manifest is more recent than the modified time of the corresponding content object in the local manifest, the value of a content object in the local manifest with the value of the content object from the remote manifest (synchronization mechanism 730). Content-processing system 718 can include instructions for inserting, responsive to determining that the modified time of the content object in the remote manifest is less recent than the modified time of the corresponding content object in the local manifest, a corresponding value and modified time of a content object from the remote manifest into a history field of the content object in the local manifest (history mechanism 728).

Data 732 can include any data that is required as input or that is generated as output by the methods and/or processes described in this disclosure. Specifically, data 732 can store at least: a manifest that represents a collection of content objects; a name of a content object; a corresponding digest of a content object; a modified time indicating the time that the content object was modified; a root hash value of the manifest, which is an additive hash value based on the digests of the content objects represented by the manifest; a collection name, or routing prefix, of a manifest, which identifies the manifest; an identifier to determine that a packet corresponds to an advertisement of the manifest or a transfer of data; and a number corresponding to a numbered chunk of the manifest based on a chunking protocol.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising, at a local node of a content-centric network in which a collection of content objects are represented in a local manifest:
   receiving, by the local node, an advertisement corresponding to a remote manifest of a remote node of the content-centric network, the advertisement indicating a routable prefix of the remote manifest;
   determining that the local node contains the local manifest indicating a same collection as the remote manifest, based on a routable prefix of the local manifest and the routable prefix of the remote manifest, wherein the local manifest represents a collection of content objects at the local node, includes corresponding hash values for the content objects, and further includes a root hash value which is an arithmetic sum of the hash values for the content objects, wherein each content object is a single piece of named data bound to a unique name that is location independent;
   in response to determining that the root hash value of the local manifest is different from a root hash value of the remote manifest, sending a request for the remote manifest, wherein the request is an interest packet that includes a unique name of the remote manifest;
   determining a set of content objects indicated in the remote manifest that are different from the content objects indicated in the local manifest; and
   in response to transmitting a set of interests that includes the unique names for the different content objects, receiving the different content objects, which causes the local node to synchronize the collection represented by the local manifest with the collection represented by the remote manifest.

2. The method of claim 1, further comprising:
   determining that the local manifest is different from the remote manifest.

3. The method of claim 1, wherein the sending the request for the remote manifest further comprises:
   sending a set of interests based on a chunking protocol, and each interest corresponds to a numbered chunk of the remote manifest.

4. The method of claim 1, wherein the transmitting the set of interests for the different content objects is based on one or more of:
   a hash value of a respective different content object; and
   a name of the respective different content object as indicated in the remote manifest.

5. The method of claim 1, wherein a respective content object represented by the remote manifest or the local manifest has a name that is a hierarchically structured variable length identifier that comprises contiguous name components ordered from a most general level to a most specific level, and the name further indicates one or more of:
   a time that the respective content object was modified; and
   a sequence number based on a time that the respective content object was modified.

6. The method of claim 1, further comprising:
   determining whether a respective content object represented by the remote manifest is more recent than a corresponding respective content object represented by the local manifest, based on one or more of:
   a time that the respective content object represented by the remote manifest was modified, wherein a later time indicates a more recent version of the corresponding respective content object represented by the local manifest;

a sequence number based on a time that the respective content object represented by the remote manifest was modified, wherein a greater sequence number indicates a more recent version of the corresponding respective content object represented by the local manifest; and an ordering of names of the content objects represented by the remote manifest, wherein an implicit sort order indicates a more recent version of the corresponding respective content object represented by the local manifest.

7. The method of claim 6, further comprising:
responsive to determining that the respective content object represented by the remote manifest is more recent than the corresponding respective content object represented by the local manifest, updating a value of the corresponding respective content object represented by the local manifest with a value of the respective content object represented by the remote manifest.

8. The method of claim 6, further comprising:
responsive to determining that the time the respective content object represented by the remote manifest was modified is less recent than a modified time of the corresponding respective content object represented by the local manifest, inserting a value and the time the respective content object represented by the remote manifest was modified into a history field of the corresponding respective content object represented by the local manifest.

9. The method of claim 1, wherein a packet sent or received by the local node indicates one or more of:
a routable prefix that identifies the remote manifest or the local manifest;
an identifier that the packet corresponds to a transfer of data;
the root hash value of the remote manifest or the local manifest;
a number corresponding to a numbered chunk of the remote manifest or the local manifest based on a chunking protocol;
a hash value of a respective content object represented by the remote manifest or the local manifest; and
a name of the respective content object represented by the remote manifest or the local manifest.

10. A computer-implemented method, comprising, at a local node of a content-centric network in which a collection of content objects are represented in a manifest:
transmitting, by the local node, an advertisement corresponding to the manifest, wherein the manifest represents the collection of content objects at the local node, the advertisement corresponds to an interest that indicates a root hash value of the manifest, and the root hash value is an arithmetic sum of the hash values for the content objects represented by the manifest, wherein each content object is a single piece of named data bound to a unique name that is location independent;
transmitting the manifest to a remote node of the content-centric network in response to receiving a request for the manifest;
receiving a request for a content object represented by the manifest, wherein the request is an interest packet that includes a unique name of the manifest; and
transmitting the content object to the remote node.

11. The method of claim 10, further comprising:
receiving a set of interests based on a chunking protocol, wherein a respective interest corresponds to a numbered chunk of the manifest.

12. The method of claim 10, wherein the interest indicates one or more of:
a routable prefix that identifies the manifest; and
an identifier that the interest advertises the manifest.

13. A non-transitory, computer-readable storage medium storing instructions that, when executed by a local node of a content-centric network in which a collection of content objects are represented in a local manifest, cause the local node to perform a method, the method comprising:
receiving an advertisement corresponding to a remote manifest of a remote node of the content-centric network, the advertisement indicating a routable prefix of the remote manifest;
determining that the local node contains the local manifest indicating a same collection as the remote manifest, based on a routable prefix of the local manifest and the routable prefix of the remote manifest, wherein the local manifest represents a collection of content objects at the local node, includes corresponding hash values for the content objects, and further includes a root hash value which is an arithmetic sum of the hash values for the content objects, wherein each content object is a single piece of named data bound to a unique name that is location independent;
in response to determining that the root hash value of the local manifest is different from a root hash value of the remote manifest, sending a request for the remote manifest, wherein the request is an interest packet that includes a unique name of the remote manifest;
determining a set of content objects indicated in the remote manifest that are different from the content objects indicated in the local manifest; and
in response to transmitting a set of interests that includes the unique names for the different content objects, receiving the different content objects, which causes the local node to synchronize the collection represented by the local manifest with the collection represented by the remote manifest.

14. The storage medium of claim 13, wherein the method further comprises:
determining that the local manifest is different from the remote manifest.

15. The storage medium of claim 13, wherein the sending the request for the remote manifest further comprises:
sending a set of interests based on a chunking protocol, and each interest corresponds to a numbered chunk of the remote manifest.

16. The storage medium of claim 13, wherein the transmitting the set of interests for the different content objects is based on one or more of:
a hash value of a respective different content object; and
a name of the respective different content object as indicated in the remote manifest.

17. The storage medium of claim 13, wherein a respective content object represented by the remote manifest or the local manifest has a name that is a hierarchically structured variable length identifier that comprises contiguous name components ordered from a most general level to a most specific level, and the name further indicates one or more of:
a time that the respective content object was modified; and
a sequence number based on a time that the respective content object was modified.

18. The storage medium of claim 13, wherein the method further comprises:
    determining whether a respective content object represented by the remote manifest is more recent than a corresponding respective content object represented by the local manifest, based on one or more of:
        a time that the respective content object represented by the remote manifest was modified, wherein a later time indicates a more recent version of the corresponding respective content object represented by the local manifest;
        a sequence number based on a time that the respective content object represented by the remote manifest was modified, wherein a greater sequence number indicates a more recent version of the corresponding respective content object represented by the local manifest; and
        an ordering of names of the content objects represented by the remote manifest, wherein an implicit sort order indicates a more recent version of the corresponding respective content object represented by the local manifest.

19. The storage medium of claim 18, wherein the method further comprises:
    responsive to determining that the respective content object represented by the remote manifest is more recent than the corresponding respective content object represented by the local manifest, updating a value of the corresponding respective content object represented by the local manifest with a value of the respective content object represented by the remote manifest.

20. The storage medium of claim 18, wherein the method further comprises:
    responsive to determining that the time the respective content object represented by the remote manifest was modified is less recent than a modified time of the corresponding respective content object represented by the local manifest, inserting a value and the time the respective content object represented by the remote manifest was modified into a history field of the corresponding respective content object represented by the local manifest.

21. The storage medium of claim 13, wherein a packet sent or received by the computer indicates one or more of:
    a routable prefix that identifies the remote manifest or the local manifest;
    an identifier that the packet corresponds to a transfer of data;
    the root hash value of the remote manifest or the local manifest;
    a number corresponding to a numbered chunk of the remote manifest or the local manifest based on a chunking protocol;
    a hash value of a respective content object represented by the remote manifest or the local manifest; and
    a name of the respective content object represented by the remote manifest or the local manifest.

22. A non-transitory, computer-readable storage medium storing instructions that, when executed by a local node of a content-centric network in which a collection of content objects are represented in a manifest, cause the local node to perform a method, the method comprising:
    transmitting an advertisement corresponding to the manifest, wherein the manifest represents the collection of content objects at the computer, the advertisement corresponds to an interest that indicates a root hash value of the manifest, and the root hash value is an arithmetic sum of the hash values for the content objects represented by the manifest, wherein each content object is a single piece of named data bound to a unique name that is location independent;
    transmitting the manifest to a remote node of the content-centric network in response to receiving a request for the manifest;
    receiving a request for a content object represented by the manifest, wherein the request is an interest packet that includes a unique name of the manifest; and
    transmitting the content object to the remote node.

23. The storage medium of claim 22, the method further comprising:
    receiving a set of interests based on a chunking protocol, wherein a respective interest corresponds to a numbered chunk of the manifest.

24. The storage medium of claim 22, wherein the interest indicates one or more of:
    a routable prefix that identifies the manifest; and
    an identifier that the interest advertises the manifest.

25. The method of claim 1, further comprising:
    transmitting an advertisement for the local manifest to another remote node, which allows the other remote node to synchronize a remote manifest of the other remote node with the local manifest, wherein the local manifest and the remote manifest of the other remote node represent a same collection of content objects, thereby facilitating synchronization of collections between network nodes.

* * * * *